US007833583B2

(12) United States Patent
Pearson et al.

(10) Patent No.: US 7,833,583 B2
(45) Date of Patent: Nov. 16, 2010

(54) METHOD OF RECYCLING ELECTROLESS NICKEL WASTE

(76) Inventors: Trevor Pearson, 8 Cricketers Meadow, Cradeley Heath, West Midlands (GB) B64 7HR; Paul Bray, 84, Woodhall Road, Calverley, Leeds (GB) LS28 5PW (*) Notice: Subject to any disclaimer, the term of this patent is extended or adjusted under 35 U.S.C. 154(b) by 688 days.

(21) Appl. No.: 11/728,757

(22) Filed: Mar. 27, 2007

(65) Prior Publication Data

US 2008/0241410 A1    Oct. 2, 2008

(51) Int. Cl.
C23C 18/36    (2006.01)

(52) U.S. Cl. .................. 427/345; 427/438; 427/443.1

(58) Field of Classification Search .................. 427/345
See application file for complete search history.

(56) References Cited

U.S. PATENT DOCUMENTS

| 4,954,265 | A |   | 9/1990  | Greenberg et al. |        |
|-----------|---|---|---------|------------------|--------|
| 4,956,097 | A |   | 9/1990  | Courduvelis      |        |
| 5,112,392 | A |   | 5/1992  | Anderson et al.  |        |
| 5,258,061 | A | * | 11/1993 | Martyak et al.   | 106/1.22 |
| 5,338,342 | A |   | 8/1994  | Mallory, Jr.     |        |
| 5,525,315 | A | * | 6/1996  | Burke            | 423/24 |
| 5,609,767 | A | * | 3/1997  | Eisenmann        | 210/665 |
| 5,665,324 | A | * | 9/1997  | Izawa et al.     | 423/308 |
| 5,730,856 | A | * | 3/1998  | Omasa            | 205/742 |
| 5,858,073 | A |   | 1/1999  | Hine et al.      |        |
| H1852     | H |   | 6/2000  | Alexander et al. |        |
| 6,136,199 | A |   | 10/2000 | SenGupta et al.  |        |
| 6,596,148 | B1|   | 7/2003  | Belongia et al.  |        |
| 6,942,779 | B2|   | 9/2005  | Belongia et al.  |        |
| 6,942,810 | B2|   | 9/2005  | Clark et al.     |        |

FOREIGN PATENT DOCUMENTS

FR    2 798 677    3/2001

OTHER PUBLICATIONS

R. W. Anderson et al., "Electroless Nickel Bath Recovery by Cation Exchange and Precipitation," 1991, pp. 233-241, XP002562171, Retrieved from the Internet: URL:http://www.p2pays.org/ref/21/20249.pdf, Retrieved on Jan. 7, 2010.
P.T. Bolger et al., "Investigation into the Rejuvenation of Spent Electroless Nickel Baths by Electrodyalisis," Environmental Science & Technology, vol. 36, 2002, pp. 2273-2278, XP002562172.

* cited by examiner

Primary Examiner—Katherine A Bareford
(74) Attorney, Agent, or Firm—Carmody & Torrance LLP

(57) ABSTRACT

An electroless nickel plating bath is provided that utilizes hypophosphite ions as a reducing agent and is substantially free of sulphate and sodium ions. Spent nickel in the plating bath is removed using an ion exchange resin and the remaining effluent solution is usable for manufacturing fertilizer compositions. The nickel is processed for inclusion back into the plating bath. Thus, the process of the invention allows for the indefinite use of the solutions without discharging hazardous waste.

12 Claims, 1 Drawing Sheet

Reprocessing Chart for Electroless Nickel

Figure 1. Reprocessing Chart for Electroless Nickel
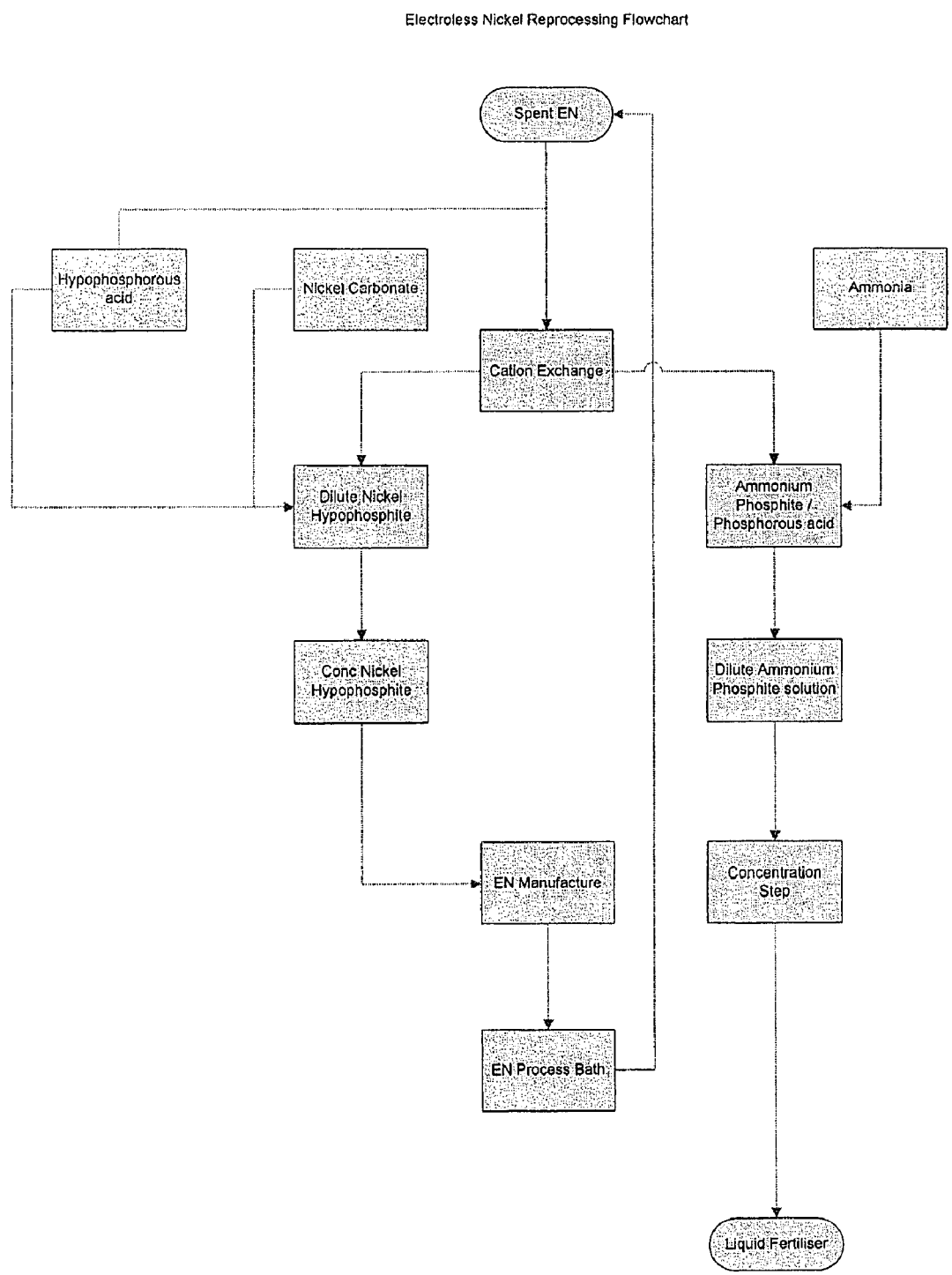

METHOD OF RECYCLING ELECTROLESS NICKEL WASTE

FIELD OF THE INVENTION

The present invention relates to electroless nickel plating solutions which utilize hypophosphite ions as a reducing agent and regeneration methods for indefinite use of the solutions without discharging hazardous waste.

BACKGROUND OF THE INVENTION

Electroless nickel plating deposits a nickel alloy onto a substrate which is capable of catalysing the deposition of this alloy from a process solution containing nickel ions and utilising a suitable chemical reducing agent which is capable of reducing nickel ions in solution to metallic nickel. These reducing agents typically include borohydride and hypophosphite ions. Typically, electroless nickel plating is carried out utilizing hypophosphite ions as the reducing agent. As the hypophosphite reduces the nickel at the catalytic surface, some phosphorus is co-deposited with the nickel yielding a nickel/phosphorus alloy containing between about 6 and 12% phosphorus. This alloy has unique properties in terms of corrosion resistance and (after heat treatment) hardness and wear resistance. Common applications of electroless nickel plating include electronics, computers, valves, aircraft parts, and copier and typewriter parts.

In spite of the many advantages of electroless nickel deposits from an engineering point of view, the deposition of electroless nickel generates significant waste. Most of the hypophosphite used to reduce the nickel becomes oxidised to phosphite which remains in the process solution and builds up in concentration until the bath must be replaced. Likewise, the source of nickel in most commercial processes is nickel sulphate, so the process solution also builds up in sulphate ion. During operation of the bath, the pH tends to fall and is corrected either by the addition of ammonia or potassium carbonate solutions. Again, these ions build up in concentration during bath operation. Eventually, the bath reaches saturation (or before this the rate of metal deposition becomes too slow for commercial operation) and has to be replaced. At the point of disposal, the waste solution typically contains nickel ions, sodium ions (from sodium hypophosphite), potassium and/or ammonium ions hypophosphite ions, phosphite ions, sulphate ions and various organic complexants (such as lactic acid or glycolic acid).

During the plating process, the nickel and hypophosphite ions are continuously depleted and must be replenished in order to maintain the chemical balance of the bath. Plating quality and efficiency decrease as the phosphite level increases in the solution, and it becomes necessary to discard the plating bath, typically after the original nickel content has been replaced four times through replenishment. This is known in the art as metal "turnover."

In order to minimize waste generated from the electroless nickel plating bath, various methods have been developed for precipitating nickel from electroless nickel waste solutions so that the nickel may be recycled and reused in the plating bath. For example, U.S. Pat. No. 4,956,097 to Courduvelis, the subject matter of which is herein incorporated by reference in its entirety, involves decomposing the waste electrolyte at high temperature and separating the precipitated metal. U.S. Statutory Invention Registration No. H1,852 to Alexander et al., the subject matter of which is herein incorporated by reference in it is entirety, suggests precipitating nickel using sodium borohydride at ambient temperature followed by removal of the remaining nickel by precipitation with sodium dimethyldithiocarbamate. U.S. Pat. No. 4,954,265 to Greenberg et al., the subject matter of which is herein incorporated by reference in its entirety, describes the use of oxalic acid to precipitate nickel from electroless nickel waste; the resulting liquid is then discharged to a sewerline. U.S. Pat. No. 5,112,392 to Anderson et al., the subject matter of which is herein incorporated by reference in its entirety, describes the removal of nickel from the electroless waste using ion exchange followed by removal of phosphite ions from the nickel-free waste stream using magnesium and calcium oxides. In most cases, the resulting sludge that remains after the nickel is separated is then disposed of in a landfill.

However, it is not believed that any of the above methods addresses the issue of the problems of disposal of the effluent solution after the nickel has been precipitated. Disposal of chemical waste to landfill is becoming more expensive and difficult and may cause damage to the environment. The phosphite ions and ammonium ions present in the electroless nickel waste have a potential use as a fertiliser. Ammonium phosphite is an excellent source of phosphorus which is absorbed through the leaves of plants. However, the presence of sodium and sulphate ions in electroless nickel waste prevents its use on a large scale as a fertiliser intermediate.

The inventors of the present invention have discovered that by utilising electroless nickel solutions based on nickel hypophosphite as a combined source of nickel and reducing agent, it is possible to remove the nickel ions from the waste stream using a suitable cation exchange resin, regenerate the resin using hypophosphorous acid (reforming nickel hypophosphite) and use the resulting solution to manufacture fresh electroless nickel solution. Following nickel removal and recycling, the remaining effluent consists mainly of ammonium phosphite, because no sodium or sulphate ions have been introduced during the operation of the original electroless nickel bath. Thus, the material is suitable for use in fertiliser applications. By a combination of a bath essentially free of sodium ions and sulphate ions with ion exchange recycling technology, the problem of disposal of electroless nickel waste is substantially eliminated.

Although sodium ions are undesirable in the production of fertiliser concentrates, potassium ions are often added as an essential mineral. During the operation of the bath of the invention, it is possible also to incorporate potassium ions, during bath maintenance (by maintaining bath pH with potassium carbonate or hydroxide) and/or during the nickel regeneration step by using the potassium form of the ion exchange resin instead of the acid form.

SUMMARY OF THE INVENTION

It is an object of the present invention to provide an improved electroless nickel plating bath solution.

It is another object of the present invention to provide an improved method of recycling electroless nickel waste to substantially eliminate the problem of waste disposal.

It is still another object of the present invention to provide an electroless nickel plating bath solution capable of being regenerated for perpetual use.

It is still another object of the present invention to provide an electroless nickel plating bath solution that is capable of perpetual operation and regeneration and that avoids the production of hazardous waste during the regeneration step.

To that end, the present invention relates to a method of operating and regenerating an electroless nickel plating bath, wherein the electroless nickel plating bath is substantially free of sulphate and sodium ions.

BRIEF DESCRIPTION OF THE DRAWINGS

FIG. 1 depicts a flowchart of one embodiment of an electroless nickel reprocessing method in accordance with the present invention.

DESCRIPTION OF THE PREFERRED EMBODIMENTS

The present invention involves a method of reprocessing an electroless nickel plating solution to deposit electroless nickel and regenerate the spent electroless nickel solution.

In order to be able to fully recycle electroless nickel waste, it is necessary to operate a process which does not contain substantial amounts of sodium ions, sulphate ions or any other ion or soluble species which would preclude the resulting effluent from being utilised as a fertiliser material or intermediate.

To that end, the present invention relates to a method of operating and regenerating an electroless nickel plating bath, wherein the electroless nickel plating bath is substantially free of sulphate and sodium ions, the method comprising the steps of:

(1) depositing electroless nickel from the electroless nickel plating bath onto a substrate, wherein the electroless nickel plating bath comprises a source of nickel ions and a source of hypophosphite ions;

(2) maintaining a suitable concentration of nickel ions and hypophosphite ions in the plating bath;

(3) operating the plating bath until a desired number of metal turnovers is reached, wherein the plating bath is "spent" and needs to be replaced for continued operation. Typically the plating bath is spent after at least about 4 metal turnovers.

(4) processing a portion of the spent electroless nickel plating bath through a cation exchange resin to separate nickel, wherein after the nickel is removed a phosphite solution comprising ammonium phosphite, ammonium hypophosphite, and organic acid remains. The resulting material, which consists of ammonium phosphite, ammonium hypophosphite and small amounts of organic acids, may be recycled for use as a fertiliser component (if potassium ions have also been introduced the mixture will also contain potassium phosphite), by way of example and not limitation.

(5) regenerating the cation exchange resin with hypophosphorus acid to produce a dilute nickel phosphite solution with an excess of hypophosphorus acid;

(6) increasing the concentration of nickel in the solution of step 5) by adding a source of nickel ions selected from the group consisting of nickel carbonate, nickel hydroxide, nickel oxide, and combinations thereof to the solution with additional hypophosphorous acid additions if necessary.

(7) adding the concentrated nickel solution of step 6) to the plating bath of step 2) to adjust the concentration of nickel ions in the plating bath.

It is highly desirable to substantially eliminate the inclusion of sodium and/or sulphate ions in the bath so that the effluent from the bath may be used in a liquid fertiliser composition. Thus, it is generally preferred that the sodium content and the sulphate content of the phosphite solution after processing through the cation exchange resin be less than about 10 g/l.

After the nickel is separated from the phosphite solution by processing through the cation exchange resin, the concentration of nickel in the phosphite solution is typically less than about 5 mg/l. If desired, additional nickel may be removed from the phosphite solution by treating the phosphite solution with dimethyldithiocarbamate or diethyldithiocarbamate ions to adjust the concentration of nickel in the phosphite solution to less than about 0.1 mg/l.

In one embodiment the phosphite solution is concentrated using evaporation or reverse osmosis techniques. Because the phosphite solution contains at most only trace amounts of sodium and sulphate ions, the phospite solution is usable as a liquid fertilizer composition or as an intermediary in a process for making fertilizer compositions.

In a preferred embodiment, the source of nickel in the electroless nickel plating solution is nickel carbonate. Other sources of nickel may also be used in the practice of the invention so long as the inclusion of sodium and sulphate ions is minimized. The plating bath optionally but preferably also comprises acetic acid, lactic acid, or a combination thereof. The plating bath also optionally but preferably comprises a source of lead ions, a source of iodate ions, or a combination thereof.

It is generally desirable that the pH of the electroless nickel plating bath be maintained between about 4 and 6. In one embodiment, the pH of the electroless nickel solution is adjusted by adding a pH adjuster selected from the group consisting of ammonia, potassium carbonate, potassium hydroxide and combinations thereof.

The temperature of the electroless nickel solution is typically maintained between about 85 and 95° C.

During the cation resin regeneration step, the pH of the solution is maintained above about 4 so that the nickel exchange reaction does not slow down.

The use of the above method enables the nickel in the waste stream to be fully recycled and the resulting effluent to be useful as a fertiliser material. In this manner, the problem of waste disposal of electroless nickel waste is substantially eliminated.

FIG. 1 depicts a flowchart of one embodiment of the electroless nickel reprocessing method of the present invention. FIG. 1 demonstrates how the electroless nickel plating bath is operated to regenerate the electroless nickel plating bath of the invention.

The present invention is further described by reference to the following non-limiting examples:

Example 1

An electroless nickel solution was made up according to the following formulation:

| | |
|---|---|
| Nickel metal | 6 g/l (added as nickel carbonate) |
| Hypophosphorous acid | 27 g/l |
| Acetic acid | 18 g/l |
| Lactic acid | 26 g/l |
| Lead | 2 ppm |
| Ammonium Iodate | 200 ppm |
| Ammonia solution | Sufficient to adjust the pH to 4.8 |

The bath was operated at 88-90° C. Nickel was plated from the bath and concentrations of hypophosphite and nickel were maintained by adding ammonium hypophosphite and nickel hypophosphite to the bath. The pH of the bath was maintained by the addition of the ammonia solution. Lead and iodate concentrations were maintained by adding lead as lead acetate and ammonium iodate.

The bath was operated in this manner until 4 metal "turnovers" had been achieved. At this point, an analysis of the bath demonstrated that the bath contained the following composition:

| | |
|---|---|
| Nickel metal | 6 g/l |
| Hypophosphite ion | 25 g/l |
| Acetic acid | 20 g/l |
| Lactic acid | 28 g/l |
| Ammonium Phosphite | 180 g/l |

The "spent" solution was then circulated through a cation exchange resin (Lewatit® TP OC1026, available from LANXESS). This resin was supplied in the sodium form so before any work was commenced, the acid form of the resin was generated by passing hypophosphorous acid through it then rinsing well with water.

As the solution was circulated, it was observed that the pH of the solution was falling as the nickel ions in solution were removed by the resin. Ammonia was added during the process in order to maintain the pH of the solution above 4 since below a pH of 4, the nickel exchange reaction slows down.

Following treatment, the nickel content of the solution was analysed and found to be less than 5 mg/l. The remaining nickel could then be removed by raising the pH of the concentrate to pH 8 and adding sodium diethyldithiocarbamate to precipitate the remaining nickel, which was then removed by filtration. Following this treatment, the nickel concentration was found to be less than 0.1 mg/l.

The nickel carrying capacity of the resin was determined to be approximately 40 g of nickel per kg of resin.

Following the above treatment, the phosphite containing solution was suitable for incorporation into fertiliser formulations. The concentration of different components was analysed as follows:

| | |
|---|---|
| Hypophosphite ion | 25 g/l |
| Acetate ion | 20 g/l |
| Lactate ion | 28 g/l |
| Ammonium Phosphite | 180 g/l |

The cation exchange resin containing the nickel ions was then regenerated using 20% hypophosphorous acid. The excess acidity in the regenerated effluent was neutralised using nickel carbonate and the resulting nickel hypophosphite concentrate could then be re-used in nickel manufacture.

The above example clearly shows the capability of the process of the invention to fully recycle electroless nickel waste. While the above example contains no alkali metal captions, small quantities of these may be utilised in the process without much detriment to the quality of the final product. For example, the iodate used as a stabiliser may be added as sodium iodate without detriment and the few ppm of sodium ions introduced during the final nickel precipitation using sodium diethyldithiocarbamate also will not be detrimental. Likewise, small amounts of sulphate will not significantly affect quality of the ammonium phosphite solution produced in the process.

Example 2

The bath described in example 1 was operated at 88-90° C. Nickel was plated from the bath and concentrations of hypophosphite and nickel were maintained by adding ammonium hypophosphite and nickel hypophosphite. The pH of the bath was maintained by adding potassium carbonate solution. Lead and iodate concentrations were maintained by adding lead as lead acetate and ammonium iodate.

The bath was operated in this manner until 4 metal "turnovers" had been achieved. At this point, the analysis of the bath gave the following composition:

| | |
|---|---|
| Nickel metal | 6 g/l |
| Hypophosphite ion | 25 g/l |
| Acetic acid | 20 g/l |
| Lactic acid | 28 g/l |
| Phosphite ions | 125 g/l |
| Potassium ions | 120 g/l |
| Ammonium ions | 25 g/l |

Nickel ions were then removed from the bath using the method described in example 1, but instead of using the acid form of the resin, the potassium form of the resin was first generated by treating the acid form of the resin with a dilute potassium hydroxide solution. This was to prevent subsequent removal of potassium ions by the ion exchange treatment. In this case, the pH of the solution did not change significantly during the nickel removal treatment. Following nickel removal, the analysis of the solution was as follows:

| | |
|---|---|
| Hypophosphite ion | 25 g/l |
| Acetic acid | 20 g/l |
| Lactic acid | 28 g/l |
| Phosphite ions | 125 g/l |
| Potassium ions | 125 g/l |
| Ammonium ions | 25 g/l |

This example illustrates that a concentrate containing potassium ions can be produced by this method. By using a combination of ammonia and potassium carbonate to maintain a bath, it is possible to obtain a wide range of nitrogen, potassium and phosphorus concentrations in the final mixture. It should be noted that in examples 1 and 2, a further concentration stage involving either evaporation or reverse osmosis could be used to further concentrate the material. Operating the electroless nickel bath to more than 4 metal turnovers would also generate a higher concentration of phosphite.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawing shall be interpreted as illustrative and not in a limiting sense.

It should also be understood that the following claims are intended to cover all of the generic and specific features of the invention described herein and all statements of the scope of the invention that as a matter of language might fall there between.

What is claimed is:

1. A method of operating and regenerating an electroless nickel plating bath, the method comprising the steps of:
   a) depositing electroless nickel from the electroless nickel plating bath onto a substrate, wherein the electroless nickel plating bath comprises a source of nickel ions and a source of hypophosphite ions;
   b) maintaining a concentration of nickel ions and hypophosphite ions in the plating bath such that plating can continue;

c) operating the plating bath until a desired number of metal turnovers is reached;

d) processing a portion of the electroless nickel plating bath through a cation exchange resin to separate nickel, wherein after the nickel is removed, a phosphite solution comprising ammonium phosphite, ammonium hypophosphite, and organic acid remains and wherein the phosphite solution comprises less than 10 g/l of sodium ions and less than 10 g/l of sulfate ions;

e) regenerating the cation exchange resin with hypophosphorous acid thereby creating a dilute nickel hypophosphorous acid solution;

f) increasing the concentration of nickel in the dilute nickel hypophosphorous acid solution of step e) by adding a source of nickel ions selected from the group consisting of nickel carbonate, nickel hydroxide, nickel oxide, and combinations thereof to the solution to form a concentrated nickel solution; and g) adding the concentrated nickel solution of step f) to the plating bath of step b) to maintain the concentration of nickel ions in the plating bath.

2. The method according to claim 1, wherein the concentration of nickel in the phosphite solution after processing through the cation exchange resin is less than about 5 mg/l.

3. The method according to claim 2, comprising the step of removing additional nickel ions from the phosphite solution by treating the phosphite solution with dimethyldithiocarbamate or diethyldithiocarbamate ions.

4. The method according to claim 2, further comprising the step of concentrating the phosphite solution using evaporation or reverse osmosis.

5. The method according to claim 4, wherein the phosphite solution is usable as a liquid fertilizer composition.

6. The method according to claim 1, wherein the source of nickel in the electroless nickel plating bath is nickel carbonate.

7. The method according to claim 1, wherein the plating bath further comprises acetic acid, lactic acid, or a combination thereof.

8. The method according to claim 1, wherein the plating bath further comprises a source of lead ions, a source of iodate ions, or a combination thereof.

9. The method according to claim 1, wherein the pH of the electroless nickel bath is about 4.0 to 6.0.

10. The method according to claim 9, wherein the pH of the electroless nickel bath is adjusted by adding a pH adjuster selected from the group consisting of ammonia, potassium carbonate, potassium hydroxide and combinations thereof.

11. The method according to claim 1, wherein during step d) the pH of the solution is above about 4.

12. The method according to claim 1, wherein the nickel plating bath is processed through at least four turnovers in step c).

* * * * *